United States Patent
Sanz Ceballos et al.

(10) Patent No.: US 9,467,081 B2
(45) Date of Patent: Oct. 11, 2016

(54) PROTECTION SYSTEM FOR A POWER CONVERTER CONNECTED TO A DOUBLY FED INDUCTION GENERATOR

(71) Applicant: INGETEAM POWER TECHNOLOGY, S.A., Zamudio (ES)

(72) Inventors: Eduardo Sanz Ceballos, Zamudio (ES); Nagore Azkarate Askasua, Zamudio (ES); Jose Carlos Alonso Segade, Zamudio (ES); Iker Esandi Uriz, Sarriguren (ES); Ainhoa Cárcar Mayor, Sarriguren (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 5 days.

(21) Appl. No.: 14/500,351

(22) Filed: Sep. 29, 2014

(65) Prior Publication Data

US 2016/0094170 A1   Mar. 31, 2016

(51) Int. Cl.
| | |
|---|---|
| *H02P 9/00* | (2006.01) |
| *F03D 9/00* | (2016.01) |
| *F03D 7/00* | (2006.01) |
| *H02J 1/00* | (2006.01) |
| *H02H 7/12* | (2006.01) |

(52) U.S. Cl.
CPC ............ *H02P 9/007* (2013.01); *H02H 7/1216* (2013.01); *H02J 1/00* (2013.01); *H02P 9/006* (2013.01)

(58) Field of Classification Search
CPC ................................ H02P 9/007; H02P 9/006
USPC .......... 290/44, 55; 700/286, 288; 322/20, 89
See application file for complete search history.

(56) References Cited

U.S. PATENT DOCUMENTS

| | | | | |
|---|---|---|---|---|
| 4,476,424 A | * | 10/1984 | Kalman | .................... H02P 5/74 318/737 |
| 6,795,287 B2 | * | 9/2004 | Kim | ........................ H02P 9/105 310/149 |
| 7,939,954 B2 | * | 5/2011 | Ruiz Flores | ............ F03D 9/003 290/44 |
| 8,373,293 B2 | | 2/2013 | Engelhardt et al. | |
| 2006/0163881 A1 | * | 7/2006 | Bucker | .................... H02P 9/007 290/44 |
| 2007/0159737 A1 | * | 7/2007 | Wobben | .................. F03D 9/003 361/20 |
| 2011/0210553 A1 | * | 9/2011 | Engelhardt | ............. F03D 9/003 290/44 |
| 2012/0139241 A1 | * | 6/2012 | Haj-Maharsi | ......... F03D 7/0224 290/44 |
| 2013/0249501 A1 | * | 9/2013 | Lu | ......................... F03D 7/0224 322/21 |

FOREIGN PATENT DOCUMENTS

WO     2014/008647 A1     1/2014

OTHER PUBLICATIONS

International Search Report and Written Opinion for PCT/EP2015/072061 dated Dec. 4, 2015.

* cited by examiner

*Primary Examiner* — Julio Cesar Gonzalez Ramirez
(74) *Attorney, Agent, or Firm* — Sughrue Mion, PLLC

(57) ABSTRACT

Protection system for a power converter connected to a doubly fed induction generator having a rotor and a stator. The power converter includes a grid-side-converter, a machine-side-converter, a DC link between both converters, a chopper connected to the DC link, and a hardware protection system connected to the rotor of the generator. The protection system includes a first control unit for controlling the hardware protection system depending on the voltage in the DC link, a second control unit for controlling the chopper depending on the DC link voltage, and a third control unit for controlling both converters.

5 Claims, 2 Drawing Sheets

PROTECTION SYSTEM FOR A POWER CONVERTER CONNECTED TO A DOUBLY FED INDUCTION GENERATOR

BACKGROUND

The document EP1965075A1 discloses a system comprising a doubly-fed inductor generator, a grid-side-converter, a grid-side-converter GSC, a machine-side-converter MSC, a DC link between both converters, a crowbar connected to rotor of the generator, a first control unit for controlling the crowbar depending on the DC link voltage, and a second control unit for controlling both converters GSC and MSC. The first and second controllers are independent of each other.

The document U.S. Pat. No. 8,373,293B2 discloses a system comprising a doubly-fed inductor generator, a grid-side-converter, a grid-side-converter GSC, a machine-side-converter MSC, a DC link between both converters, a chopper connected to the DC link, a crowbar connected to rotor of the generator, a converter controller for controlling both converters GSC and MSC, and a separate protection device for controlling both the chopper and the crowbar.

SUMMARY OF THE DISCLOSURE

The protection system comprises a doubly-fed inductor generator comprising a rotor and a stator, which is part of a wind turbine; a grid-side-converter; a machine-side-converter; a DC link between both converters; a chopper connected to the DC link; a Final Hardware Protection System (FHPS) connected to the rotor of the generator; a first control unit for controlling the FHPS depending on the voltage in the DC link (it continuously reads the DC link voltage); a second control unit for controlling the chopper depending on the DC link voltage (it continuously reads the DC link voltage); and a third control unit for controlling both converters.

The chopper is responsible for absorbing the undesirable energy increase in the DC link, and the FHPS is responsible for disconnecting the generator if the DC link voltage increases to exceed a threshold value. When the FHPS is activated (it is a hardware controlled system that short circuits the rotor terminals without resistances) the wind turbine is disconnected from the grid and passes to an emergency state, unlike the crowbars described in prior art cited in the background field that include resistive elements and that are disconnected once the transient has passed.

The three control units are independent of each other, each control unit having its own processor, and with said independence at least the following advantages can be obtained:
- As the control units operate independently of each other, the response time to any event is very quick as there is no interference between said control units.
- If the first control unit fails, the control over the chopper is not lost as the second control unit remains operative, allowing the system to remain connected to the grid and coping with FRT (Fault-Ride-Through) events.
- If the second control unit fails, the control over the FHPS is not lost as the first control unit remains operative. The system can remain connected to the grid increasing energy production, if it is so required.
- The same first and second control unit can also been used in other systems, for example: the first control unit can be used in other systems without a chopper; and the second control unit can be used in other systems without a FHPS, such as wind turbines of full converter topology. Therefore, said configuration of control units allows having more flexible solutions (control units adapted to be used in different systems).
- The control over the FHPS and the chopper are only lost if both control units fail simultaneously.

These and other advantages and characteristics will be made evident in the light of the drawings and the detailed description thereof.

DETAILED DESCRIPTION

Figure 1:
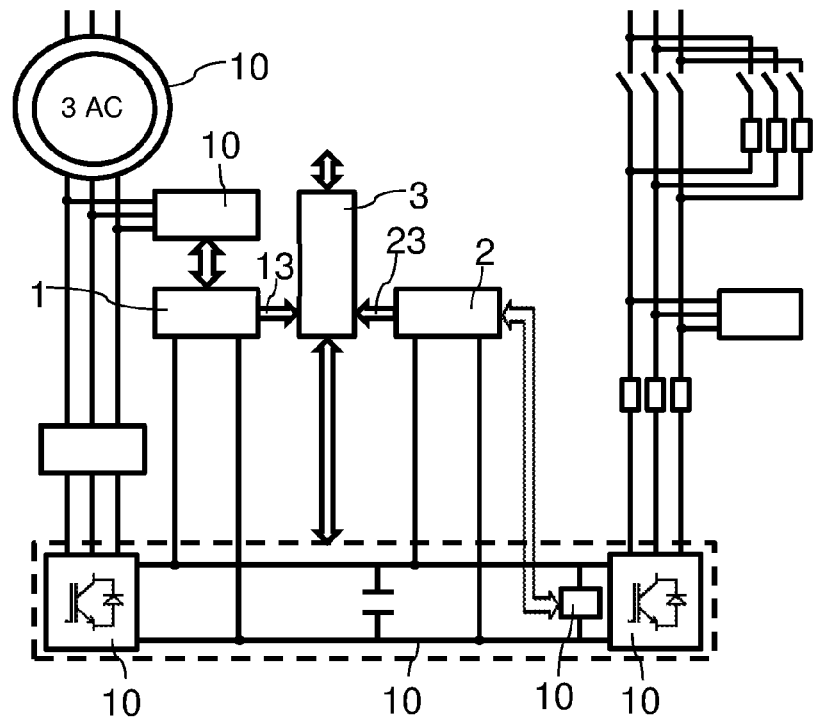
FIG. 1 is a schematic view of an embodiment of a protection system.

The proposed system comprises a doubly-fed inductor generator 100 comprising a rotor and a stator, which is part of a wind turbine; a grid-side-converter 101; a machine-side-converter 102; a DC link 103 between both converters; a chopper 104 connected to the DC link 103; a Final Hardware Protection System (FHPS) 105 connected to the rotor of the generator 100; a first control unit 1 for controlling the FHPS 105 depending on the voltage Vbus in the DC link 103 (it continuously reads the DC link voltage Vbus); a second control unit 2 for controlling the chopper 104 depending on the DC link voltage Vbus (it continuously reads the DC link voltage Vbus); and a third control unit 3 for controlling both converters 101 and 102.

The chopper 104 is responsible for absorbing the undesirable energy increase in the DC link 103, and the FHPS 105 is responsible for disconnecting the generator 100 if the DC link voltage Vbus increases to exceed a threshold value. When the FHPS 105 is activated (it is a hardware controlled system that short circuits the rotor terminals without resistances) the wind turbine is disconnected from the grid and passes to an emergency state, unlike the crowbars described in prior art cited in the background field that include resistive elements and that are disconnected once the transient has passed.

The three control units 1, 2 and 3 are independent of each other, each control unit 1, 2 and 3 having its own processor. Each processor can be a PLD ("Programmable Logic Device"), a CPLD ("Complex Programmable Logic Device"), a FPGA ("Field Programmable Gate Array") or any other equivalent device. In FIG. 1 a first communication link 13 between the first control unit 1 and the third control unit 3 and a second communication link 23 between the second control unit 2 and the third control unit 3 is shown, but said communication links 13 and 23 are adapted for communication between a corresponding one of the control units 1, 2 and the third control unit 3. Additionally, this communication is a one way communication in only one direction, said direction being from the corresponding control unit 1, 2 to the third control unit 3. Thus, said communication links 13 and 23 serve to inform the third control unit 3 about the state (operative or non-operative) of the control units 1 and 2. Additionally, the communications are limited to status updates and do not provide any direct control purpose. Thus, if these communications are interrupted, for example, the control units 1 and 2 continue controlling the FHPS 105 and the chopper 104 respectively, and the third control unit 3 continues controlling both converters 101 and 102. Due to said communications protocol, the first control unit 1 sends a corresponding state signal to the third control unit 3 when operative and the second control unit 2 sends a corresponding state signal to the third control unit 3 when operative, the third control unit 3 determining that control unit 1, 2 is operative upon receiving the corresponding signal, and that a control unit 1, 2 is not operative upon not receiving the corresponding state signal. The control units 1 and 2 can send the corresponding state signal continuously, or they can send said state signals periodically (with a known period). There is no communication between control units 1 and 2.

Alternatively, instead of a first communication link 13 between the first control unit 1 and the third control unit 3 and a second communication link 23 between the second control unit 2 and the third control unit 3 as shown in FIG. 1, a first communication link outputting the first control unit 1 and a second communication link outputting the second control unit 2 can be serially connected by means of at least one switch, the common link being connected to the third control unit 3. Therefore, via the common link the status of the first control unit 1 and of the second control unit 2 can also reach the third control unit 3.

With the independence between the three control units 1, 2 and 3 at least the following advantages are obtained:

- As the control units 1, 2 and 3 operate independently of each other, the response time to any event is very quick as there is no interference between said control units 1, 2 and 3.
- If the first control unit 1 fails, the control over the chopper 104 is not lost as the second control unit 2 remains operative, allowing the system to remain connected to the grid and coping with FRT (Fault-Ride-Through) events.
- If the second control unit 2 fails, the control over the FHPS 105 is not lost as the first control unit 1 remains operative. The system can remain connected to the grid increasing energy production, if it is so required.
- The same first and second control unit 1 and 2 can also been used in other systems, for example: the first control unit 1 can be used in other systems without a chopper 104; and the second control unit 2 can be used in other systems without a FHPS 105, such as wind turbines of full converter topology. Therefore, said configuration of control units allows having more flexible solutions (control units adapted to be used in different systems).
- The control over the FHPS 105 and the chopper 104 are only lost if both control units 1 and 2 fail simultaneously.

Each control unit 1 and 2 can also comprise a specific power supply associated, so that both control units 1 and 2 can also be autonomous. The control units 1 and 2 are normally supplied by the grid (via DC-bus) or by an UPS ("Uninterruptible Power System") comprised in the system, and if the voltage of the grid drops below a predetermined value and the UPS fails, thanks to the specific power supply, the control units 1 and 2 are operative during a predetermined time interval in order to control the FHPS 105 and the chopper 104 respectively during said time. Each specific power supply can comprise a bank or capacitors, a battery or other equivalent arrangement, designed for supplying power to the corresponding control unit 1 or 2 during said time interval.

The control over the chopper 104 works as follows:

The chopper 104 is formed by n-branches, each branch being formed by at least one semiconductor switch and a resistor (not shown in figures). Preferably, all the switches are operated simultaneously.

Figure 2:
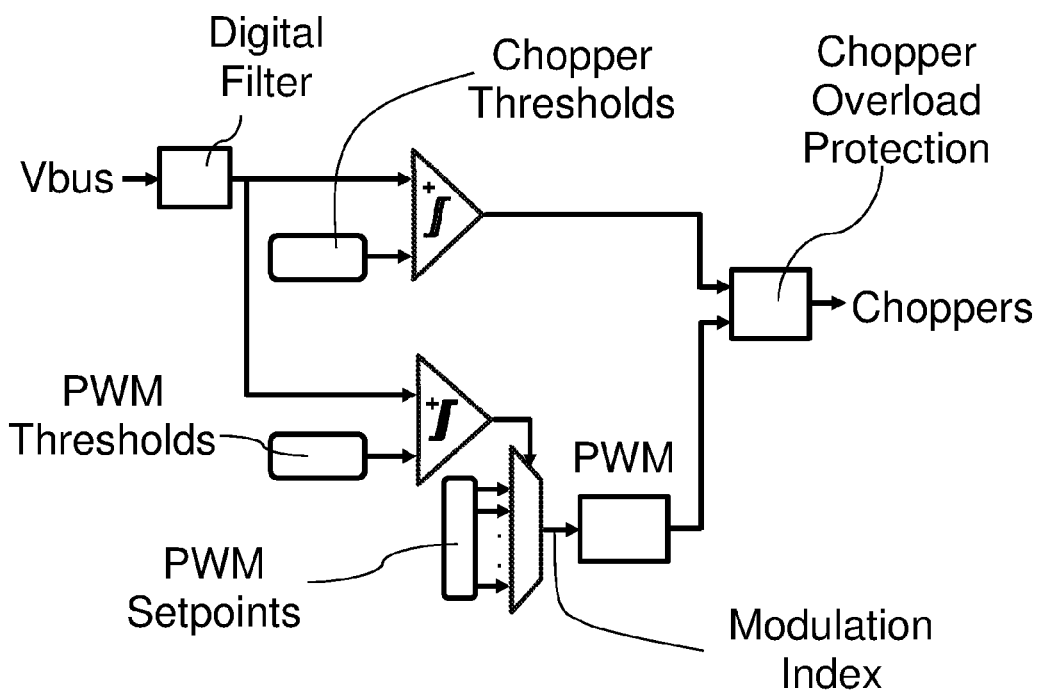
FIG. 2 shows a block representation of the control acted on a chopper of the protection system of FIG. 1.

The second control unit 2 implements a conventional Pulse Width Modulation (PWM) control and a hysteresis control, as shown in FIG. 2. If the DC link 103 exceeds a threshold value previously fixed (Chopper Lower PWM Threshold CLPT), then the second control unit 2 acts on the chopper 104, generating a signal modulated by the PWM control for actuating over the switches of the chopper 104. The PWM control acts on the chopper 104 when the DC link voltage Vbus is between the CLPT threshold and a Chopper Upper PWM Threshold CUPT. In an exemplary embodiment it comprises eight regions with associated to eight modulation rates, each one defining the time interval during which the semiconductor switches of the chopper 104 are ON during a determined period T: if the modulation rate is 1 the switches are closed along all the period T; if the modulation rate is 0 the switches are opened along all the period.

Each region is associated to the DC link voltage Vbus as shown in the following table:

| Region | Chopper Lower PWM Threshold CLPT | Chopper Upper PWM Threshold CUPT | Modulation rate |
| --- | --- | --- | --- |
| 1 | 1191.76 V (0x590) | 1198.46 V (0x598) | 0.01 (10.70 us) |
| 2 | 1198.46 V (0x598) | 1205.15 V (0x5A0) | 0.02 (21.40 us) |
| 3 | 1205.15 V (0x5A0) | 1211.85 V (0x5A8) | 0.03 (32.10 us) |
| 4 | 1211.85 V (0x5A8) | 1218.54 V (0x5B0) | 0.04 (42.80 us) |
| 5 | 1218.54 V (0x5B0) | 1225.24 V (0x5B8) | 0.05 (53.50 us) |
| 6 | 1225.24 V (0x5B8) | 1231.93 V (0x5C0) | 0.06 (64.25 us) |
| 7 | 1231.93 V (0x5C0) | 1238.63 V (0x5C8) | 0.07 (74.95 us) |
| 8 | 1238.63 V (0x5C8) | 1285.50 V (0x600) | 0.15 (160.60 us) |

The greater the DC link voltage Vbus the greater the energy that must be absorbed by the chopper 104, and thus the greater is the time that the switches of the chopper 104 must remain ON (closed) to absorb this energy.

If the value of the DC link voltage Vbus exceeds the Chopper Upper PWM Threshold CUPT (region 8=1285.50V) of the last modulation rate, it is assumed that the PWM control is not able to control the DC link voltage Vbus and the hysteresis control is activated. This hysteresis control is then activated when a Chopper Hysteresis Activation Threshold CHAT is reached, which can be equal to or, for safety purposes, lower than the Chopper Upper PWM Threshold CUPT. This means that the semiconductor switches of the chopper 104 remain closed (ON) along the period T, until the DC link voltage Vbus drops down to a Chopper Hysteresis Deactivation Threshold CHDT value (for example 997.6V, as shown in FIG. 3), the PWM control being ignored until this situation occurs.

| Chopper Hysteresis Activation Threshold CHAT | Chopper Hysteresis Deactivation Threshold CHDT |
| --- | --- |
| 1272.10 V (0x5F0) | 997.60 V (0x4A8) |

If the hysteresis control is not able to reduce the DC link voltage Vbus, the first control unit 1 causes the FHPS 105 to be activated when the DC link voltage Vbus reaches or exceeds an FHPS Activation Threshold FAT (shown in FIG. 3) over the CUPT threshold, the generator 100 being disconnected from the grid.

Figure 3:
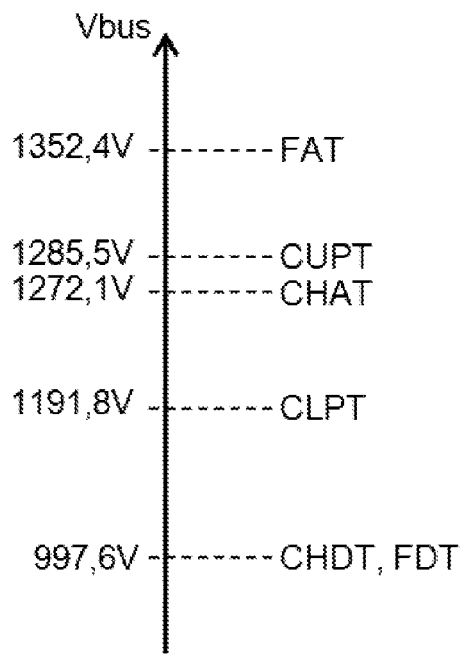
FIG. 3 is an axis of ordinate defining several threshold values of the DC link voltage according to the protection system of FIG. 1.

FIG. 3 shows different operation areas of the control over the chopper 104:

Area between CHDT and CLPT thresholds: normal operation of the system. The chopper 104 is OFF (opened) and the FHPS 105 is also OFF (opened). The wind turbine could operate in this area without having the control units 1 and 2 operative. In said conditions, the system is able to work at DC link voltage Vbus up to the CLPT threshold.

Area between CLPT and CUPT thresholds: The second control unit 2 acts on the chopper 104, and the FHPS 105 is OFF. The second control unit 2 controls the chopper 104 implementing the PWM control. The wind turbine could operate in this area without having the first control unit 1 operative. The third control unit 3 is communicated with the other two control units 1 and 2, so, if the first control unit 1 fails, it is able to detect that said first control unit 1 has failed and passes the system to an emergency state (and decouples the system from the grid for example) if the Chopper Hysteresis Activation Threshold CHAT is reached in order to protect the system components.

Area between CHAT and FAT thresholds: The second control unit 2 acts on the chopper 104, and the FHPS 105 is OFF. The second control unit 2 controls the chopper 104 implementing the hysteresis control. The wind turbine could operate in this area without having the first control unit 1 operative, in this case, the third control unit 3 detects said situation and if the DC link voltage Vbus reaches the FHPS Activation Threshold FAT, it passes the system to an emergency state (and decouples the system from the grid for example).

When working in areas between the CLPT and FAT thresholds, if the first control unit 1 is not operative, the system is also able to work.

DC link voltage Vbus higher than FHPS Activation Threshold FAT threshold: The chopper 104 is OFF (opened) and the first control unit 1 causes the FHPS 105 to be closed (ON). The wind turbine could operate in this area even without having the second control unit 2 operative.

The second control unit 2 informs the third control unit 3 about its state continuously, in particular if it is operative or not, if the switches of the chopper 104 are ordered to be ON or OFF, and if there is an overload on any switch or any resistor of the chopper 104.

To detect an overload, the time that the switch is being fired is taken into account, taking also into account the time that it is going to be off (opened) during each period due to that the cooling during the off state is slower than the heating during ON state. Said time affects to the switch itself and also to the associated resistor, but due to the different characteristic of a switch and of a resistor, the switches and the resistors are preferably treated independently (one can be overloaded before the other one for example).

For example:
Overload of a switch:
$T_{ON\ MAX}$: 50 ms (max. time for overload)
$T_{OFF\ MAX}$: 250 ms (cooling total time)
$T_{HYST}$: $T_{OFF\ MAX}/2 = 125$ ms (cooling time to deactivate the error)

Overload of a resistor:
$T_{ON\ MAX}$: 270 ms (max. time for overload)
$T_{OFF\ MAX}$: 600 s (cooling total time)
$T_{HYST}$: $T_{OFF\ MAX}/2 = 300$ s (cooling time to deactivate the error)

During an overload the firings over the switches are preferably ordered to be OFF, unless a higher-level priority reason occurs.

Figure 4:
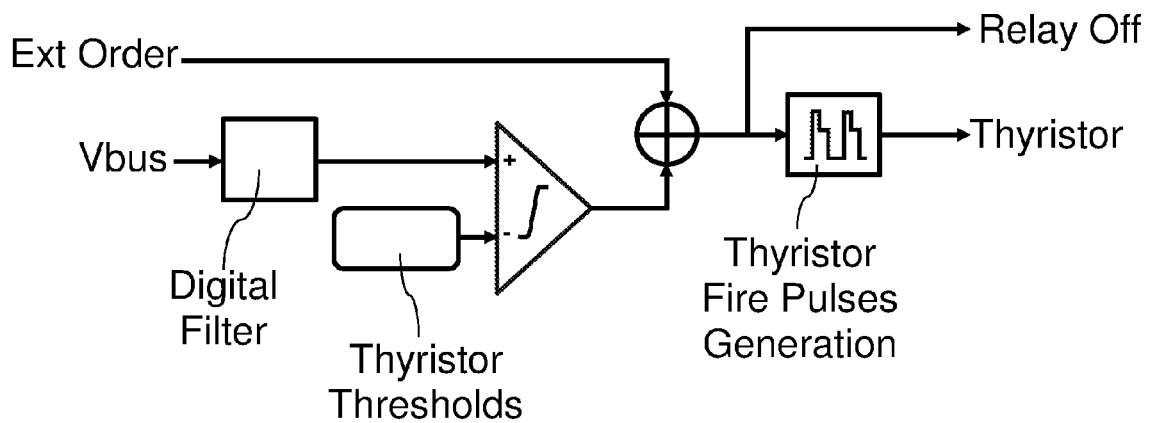
FIG. 4 shows a block representation of the control acted on a FHPS of the protection system of FIG. 1.

The control over the FHPS 105 works as follows:

As noted before, the system comprises a Final Hardware Protection System (FHPS) 105 comprising a thyristor, for the situations where the DC link voltage Vbus exceeds the FHPS Activation Threshold FAT value, controlled by a first control unit 1. The generator 100 is then stopped and decoupled from the grid. If said situation occurs, the first control unit 1 sends an appropriate signal to the thyristor of the FHPS 105 to short-circuit the rotor until said DC link voltage Vbus drops to the Chopper Hysteresis Deactivation Threshold CHDT (thus also defines as FHPS Deactivation Threshold FDT), as shown in FIG. 4.

| FHPS Activation Threshold FAT | FHPS Deactivation Threshold FDT |
|---|---|
| 1352.45 V (0x650) | 997.60 V (0x4A8) |

The first control unit 1 informs the third control unit 3 about its state continuously, in particular if it is operative or not, and if the FHPS 105 is ON or OFF.

What is claimed is:

1. Protection system for a power converter connected to a doubly fed induction generator, the system comprising:
    a doubly-fed induction machine with a stator and a rotor, the stator of said doubly-fed induction machine being connected to a grid and the rotor of said doubly-fed induction machine being connected to the grid via a converter unit, said converter unit having a machine side converter, a grid side converter and a DC link connecting the machine side converter and the grid side converter;
    a hardware protection system connected to the rotor of the doubly-fed induction machine;
    a chopper connected to the DC link;
    a first control unit for controlling the hardware protection system;
    a second control unit for controlling the chopper; and
    a third control unit for controlling the machine side converter and the grid side converter, wherein each of the first control unit, the second control unit and the third control unit comprises a respective processor, the first control unit, the second control unit and the third control unit being configured to operate independent of each other for controlling the hardware protection system, the chopper and the machine and grid side converters, respectively,
    a state signal from each of the first control unit and the second control unit is sent to the third control unit when the first control unit and the second control unit are operative; and, using said third control unit, it is determined that the first control unit and the second control unit are operative in response to receiving the corresponding state signal from the first control unit and the second control unit and that the first control unit and the second control unit are not operative in response to not receiving the corresponding state signal.

2. Protection system according to claim 1, further comprising a first communication link configured to communicate between the first control unit and the third control unit, and a second communication link configured to communicate between the second control unit and the third control unit.

3. Protection system according to claim 2, wherein the first communication link and the second communication link are adapted to communicate in only one direction, said direction being from the corresponding one of the first control unit and the second control unit to the third control unit.

4. Method according to claim 1, wherein if the third control unit determines that the first control unit is not operative, the second control unit controls the chopper if the voltage in the DC link is between a chopper lower threshold value and a chopper hysteresis activation threshold value, and the third control unit decouples the system from the grid if the DC link voltage reaches a hardware protection system activation threshold, which is higher than the chopper hysteresis activation threshold.

5. Method according to claim 1, wherein if the third control unit determines that the second control unit is not operative, the chopper is not controlled and the first control unit controls the hardware protection system if the DC link voltage reaches the hardware protection system threshold which is higher than the chopper hysteresis activation threshold.

* * * * *